(12) United States Patent  (10) Patent No.: US 7,048,200 B2
Sweet  (45) Date of Patent: May 23, 2006

(54) INTEGRATED INJECTION-PUMPING FIXTURE FOR TRANSFERRING HEAT BETWEEN HIGHER AND LOWER-TEMPERATURE LOOPS IN A HYDRONIC HEATING SYSTEM

(75) Inventor: David Sweet, Old Saybrook, CT (US)

(73) Assignee: Taco, Inc., Cranston, RI (US)

( * ) Notice: Subject to any disclaimer, the term of this patent is extended or adjusted under 35 U.S.C. 154(b) by 361 days.

(21) Appl. No.: 10/607,852

(22) Filed: Jun. 27, 2003

(65) Prior Publication Data

US 2004/0262412 A1 Dec. 30, 2004

(51) Int. Cl.
F24D 19/02 (2006.01)

(52) U.S. Cl. .................... 237/69; 165/171; 165/56

(58) Field of Classification Search .............. 237/69, 237/43; 165/56, 49, 171; 454/185
See application file for complete search history.

(56) References Cited

U.S. PATENT DOCUMENTS

| | | | |
|---|---|---|---|
| 2,784,945 A | * | 3/1957 | Fodor .................... 165/247 |
| 3,433,414 A | | 3/1969 | Boes |
| 3,939,905 A | * | 2/1976 | Gettmann .................. 165/49 |
| 4,566,628 A | | 1/1986 | Latarius |
| 5,248,084 A | | 9/1993 | Latarius |
| 5,390,660 A | * | 2/1995 | Danielson ............ 126/271.2 R |
| 5,643,482 A | * | 7/1997 | Sandelman et al. ......... 219/497 |
| 6,126,081 A | * | 10/2000 | Calvin et al. .......... 237/12.3 B |
| 6,220,520 B1 | | 4/2001 | Gibbs |
| 6,345,770 B1 | | 2/2002 | Simensen |
| 6,347,748 B1 | | 2/2002 | Lyons |

FOREIGN PATENT DOCUMENTS

| | | |
|---|---|---|
| DE | 1579954 | 9/1970 |
| DE | 1653743 A | 7/1971 |
| DE | 2032805 | 1/1972 |
| EP | 0358843 A1 | 3/1990 |

OTHER PUBLICATIONS

Siegenthaler, Modern Hydronic Heating for Residential and Light Commercial Buildings, p. 334 (1995).

* cited by examiner

Primary Examiner—Derek S. Boles
(74) Attorney, Agent, or Firm—Fish & Richardson P.C.

(57) ABSTRACT

An integrated injection-pumping fixture for transferring heat from a higher-temperature loop to a lower-temperature loop (e.g., in radiant heating, from a boiler loop to a radiant loop). The fixture provides an injection loop for transferring heat from the higher-temperature loop to the lower-temperature loop. The fixture comprises an integrated casting, in which are formed higher-temperature supply and return ports, lower-temperature supply and return ports, an injection pump volute, and a lower-temperature pump volute. Liquid from the higher-temperature loop enters the integrated casting through the higher-temperature supply port, mixes with liquid circulating in the lower-temperature loop, and leaves the integrated casting through the higher-temperature return port. Liquid circulating in the lower-temperature loop enters the integrated casting through the lower-temperature return port, mixes with liquid entering from the higher-temperature loop, and leaves the integrated casting through the lower-temperature supply port. The invention simplifies installation by integrating into one integrated casting all four ports and both the injection pump and lower-temperature loop pump.

10 Claims, 7 Drawing Sheets

INTEGRATED INJECTION-PUMPING FIXTURE FOR TRANSFERRING HEAT BETWEEN HIGHER AND LOWER-TEMPERATURE LOOPS IN A HYDRONIC HEATING SYSTEM

TECHNICAL FIELD

This invention relates to hydronic radiant heating systems, and in some aspects to hydronic heating.

BACKGROUND

A radiant heating system is composed of tubing embedded in flooring, walls, or ceilings of the area to be heated. Heated water is pumped through this tubing to raise the temperature of the surface (thermal mass). Heat energy radiating from the thermal mass heats the objects in the room. As the method of heat transfer in these systems is primarily radiant, lower temperature water is required to heat the thermal mass than is typically needed for convection type systems (e.g., finned tube baseboard heating). In systems where the heat source is not solely dedicated to supplying heated water to the radiant loop, a means of tempering the higher temperature water from a boiler loop, or other type of heating unit loop, is necessary to maintain lower temperature requirements in the radiant loop. An injection loop can perform this tempering by supplying water from the boiler loop to the radiant loop. The amount of heated water injected into the radiant loop can be set using a manually adjusted mixing valve, or using a variable speed injection pump.

Figure 1:
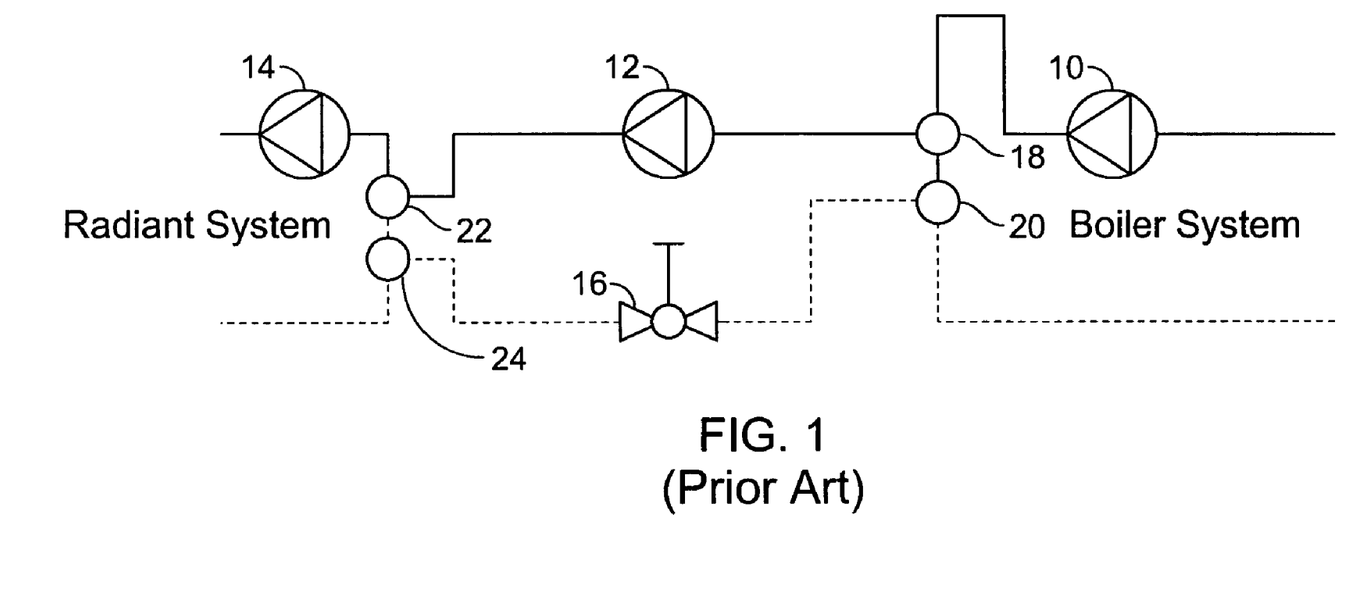
FIG. 1 is a schematic of a prior art injection pumping arrangement for radiant heating.
Figure 2:
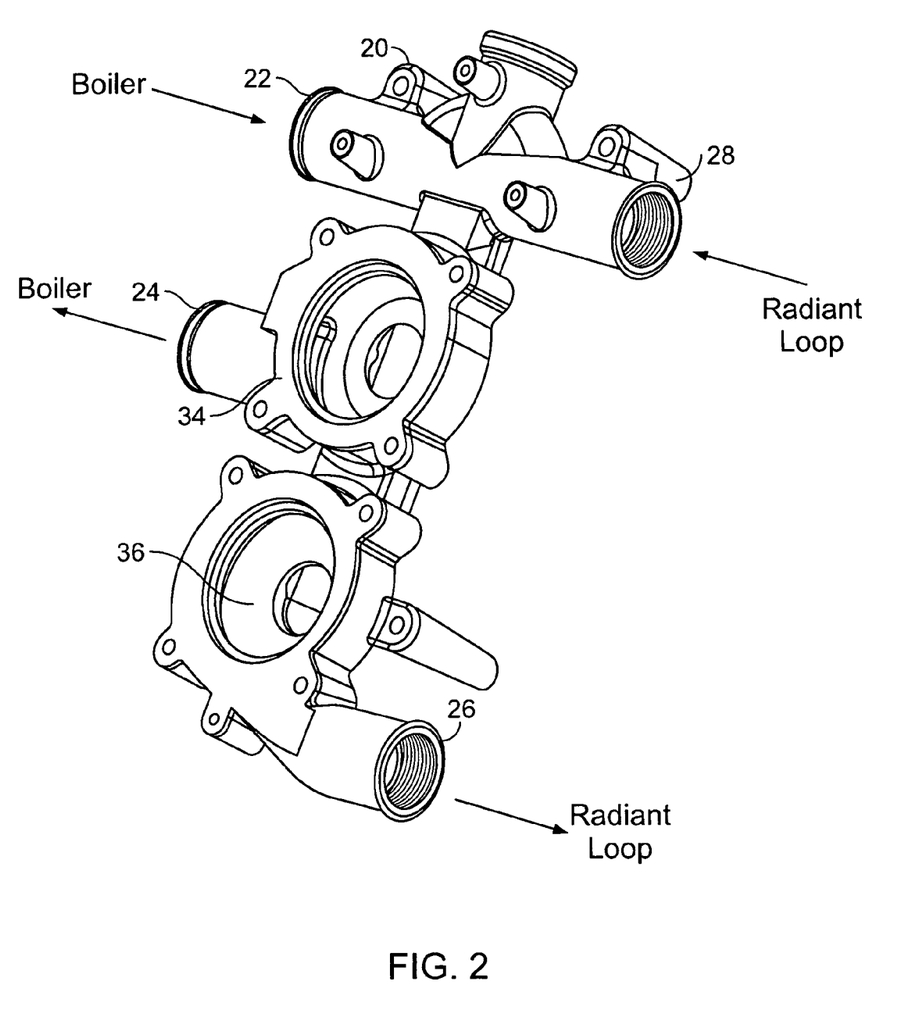
FIG. 2 is a perspective view of the integrated casting of one implementation of the invention.
Figure 3:
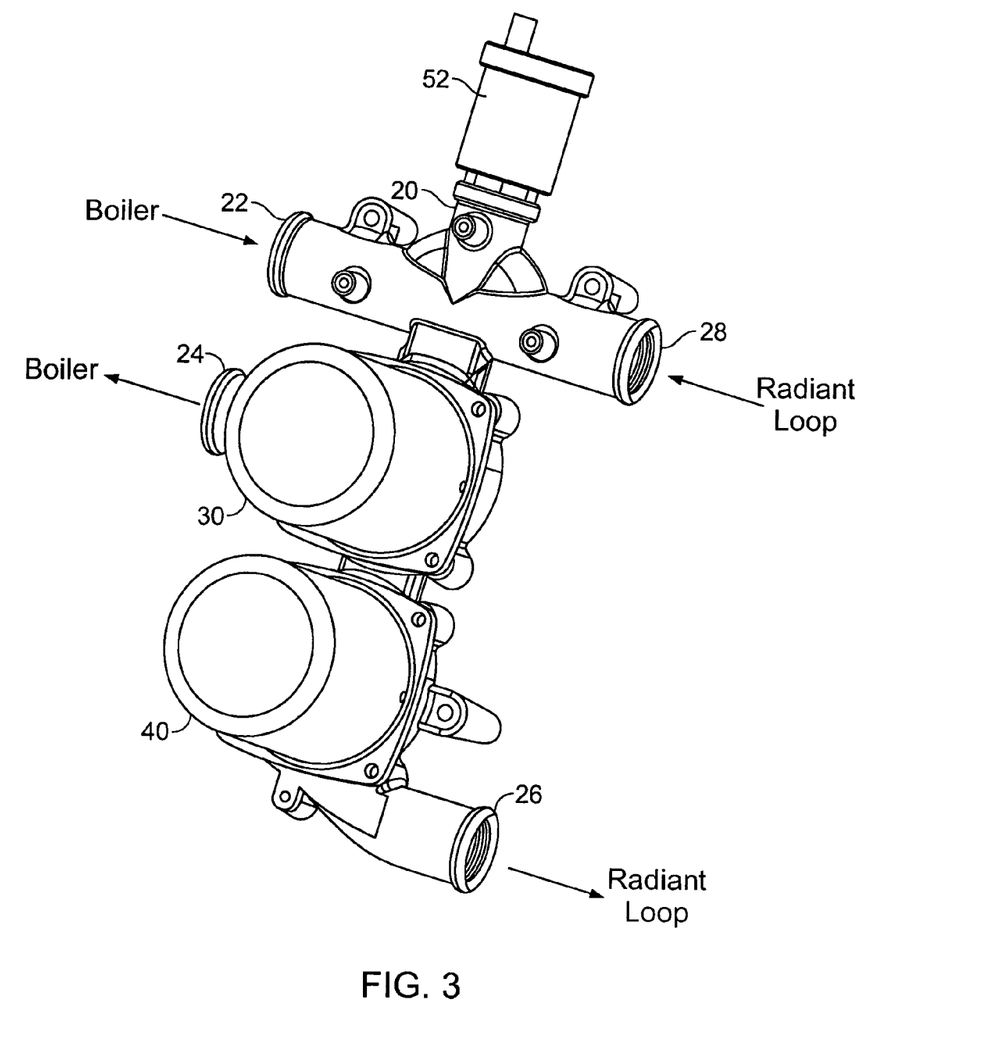
FIG. 3 is the same perspective view as FIG. 2 but with the circulator pumps installed.
Figure 4:
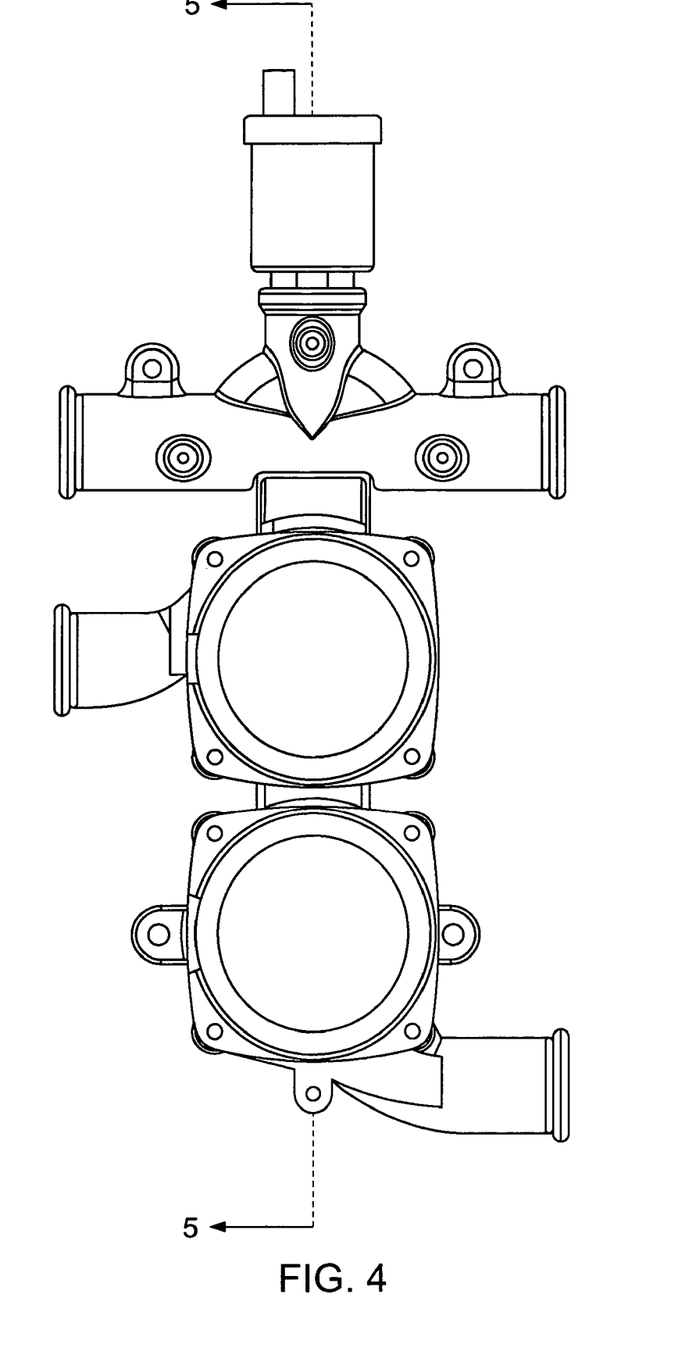
FIG. 4 is an elevation view of the implementation of FIGS. 2 and 3.
Figure 5:
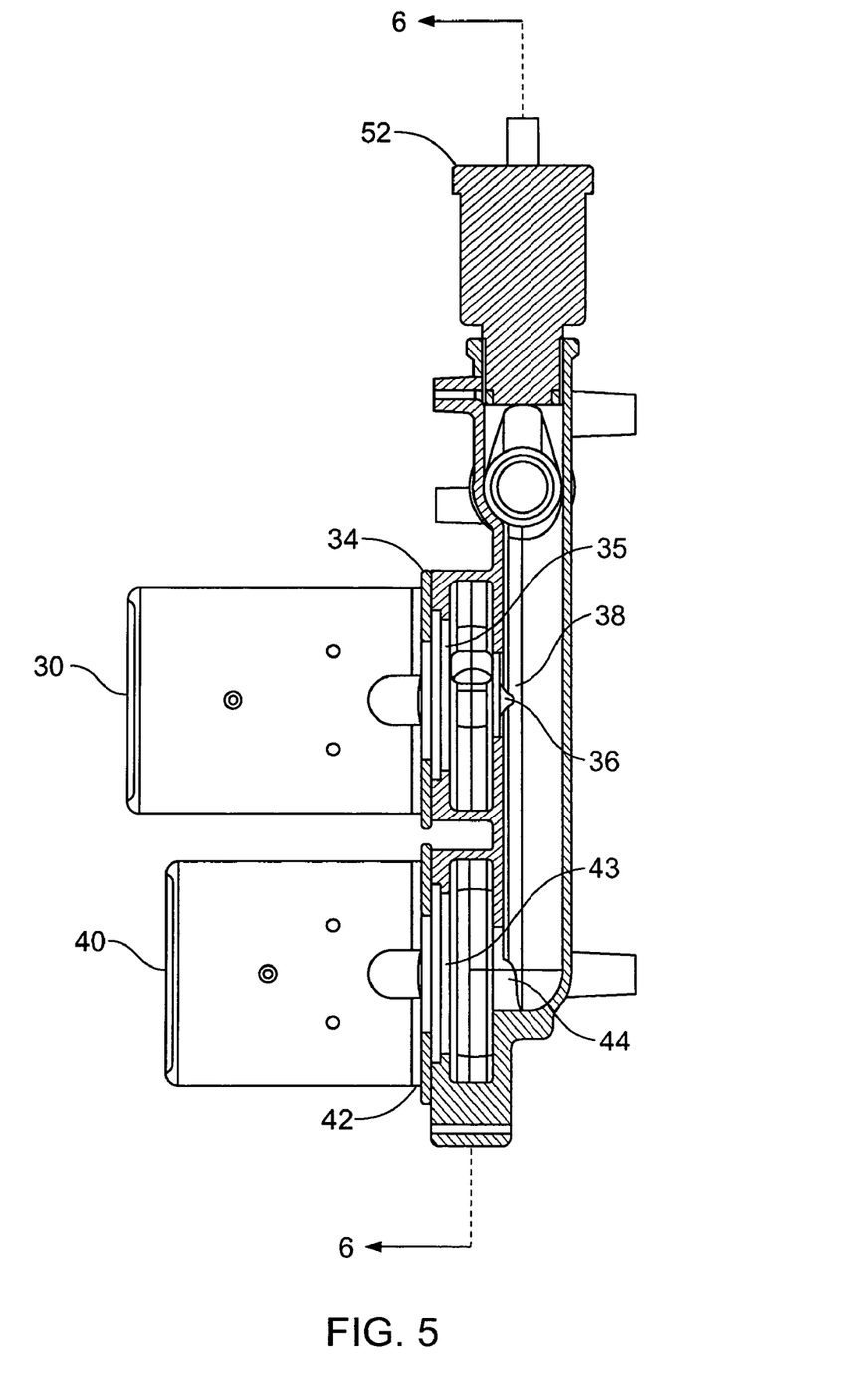
FIG. 5 is a cross-sectional view taken at 5—5 in FIG. 4.
Figure 6:
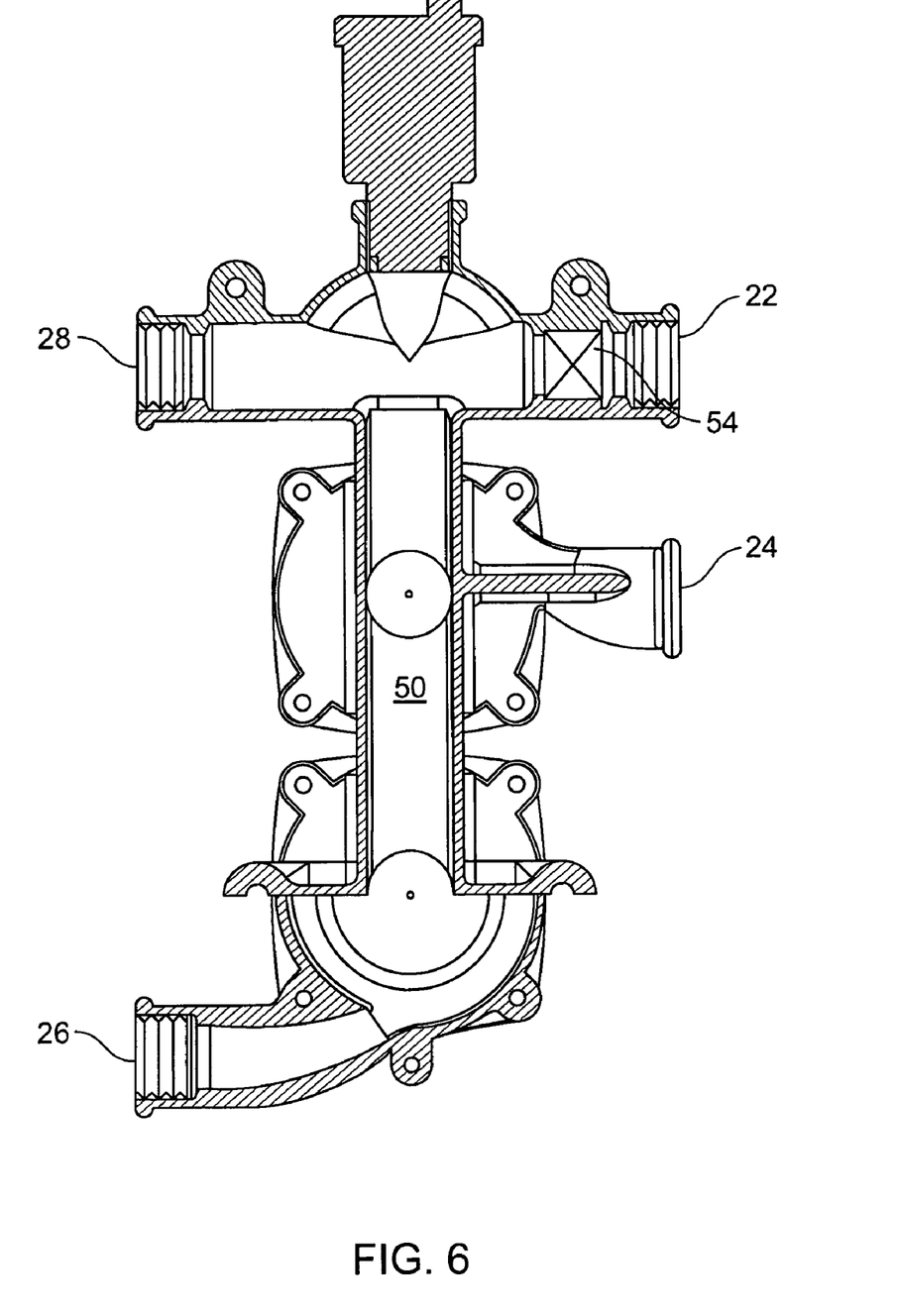
FIG. 6 is a cross-sectional view taken at 6—6 in FIG. 5.
Figure 7:
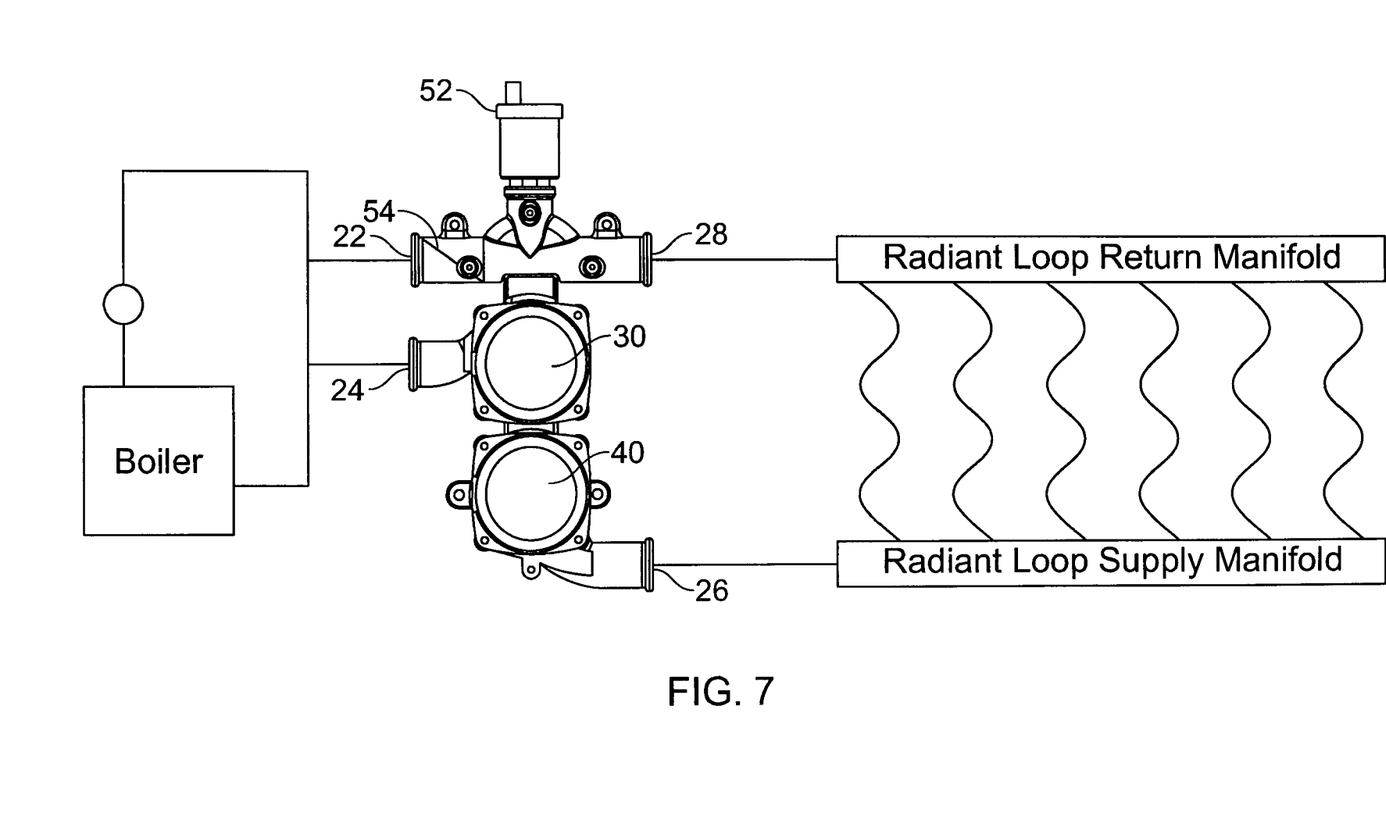
FIG. 7 is a flow schematic of the implementation of FIGS. 2 and 3.

In an injection pumping system, the amount of heated water injected into the radiant loop is at the demand of a control system that senses the radiant loop return water temperature and compares it to a specific set point or a difference between the entering water temperature and the returning water temperature. FIG. 1 shows a typical prior art injection system. There are three independent pumps: a boiler pump 10 circulating water in the boiler loop, an injection pump 12 for drawing water out of the boiler loop into the radiant loop, and a radiant loop pump 14 for circulating water through the radiant loop. A manually adjusted balancing valve 16 is typically installed in the injection loop to adjust the percentage of mixing between the injection and radiant loops. An air elimination device (not shown in FIG. 1) can also be installed to avoid entrapped air from affecting the performance of the system. Care must be exercised on installation to make sure that the supply and return junctions 18, 20 in the boiler loop, at which water is drawn into and returned from the injection loop, are not positioned too far apart, as otherwise a "ghost flow" into the radiant loop can occur even when the injection pump is off, as a result of friction-induced differential pressure between the two junctions. A similar ghost flow can occur if the junctions 22, 24 in the radiant loop, at which water is drawn into and returned from the radiant loop, are positioned too far apart. A reference describing such prior art systems is *Modern Hydronic Heating for Residential and Light Commercial Buildings*, John Siegenthaler, P. E., p. 334 (1995).

The injection and radiant loop pumps, balancing valve, junction fittings, and connecting lengths of pipe can either be assembled in the field, or pre-assembled on a support panel, for example, as disclosed in Lyons U.S. Pat. No. 6,347,748.

The injection pump and radiant loop pump are typically of the wet rotor circulator type. The pump impeller is received in a mating cavity known as a volute. Typically, the volute is surrounded by a flange to which the pump is attached. When the pump is installed, and the impeller thereby positioned within the volute, water enters the pump through an inlet at the center of the volute, and exits through an outlet in the periphery of the volute.

Sometimes multiple radiant loop pumps are used in radiant heating system. In this case, the multiple radiant loop pumps can be installed in volutes formed in a common manifold, as shown in Simensen U.S. Pat. No. 6,345,770. A separate injection pump supplies water from the boiler loop to the manifold.

SUMMARY

In general, the invention features an integrated injection-pumping fixture for transferring heat from a higher-temperature loop to a lower-temperature loop (e.g., in radiant heating, from a boiler loop to a radiant loop). The fixture provides an injection loop for transferring heat from the higher-temperature loop to the lower-temperature loop. The fixture comprises an integrated casting, in which are formed higher-temperature supply and return ports, lower-temperature supply and return ports, an injection pump volute, and a lower-temperature pump volute. Liquid from the higher-temperature loop enters the integrated casting through the higher-temperature supply port, mixes with liquid circulating in the lower-temperature loop, and leaves the integrated casting through the higher-temperature return port. Liquid circulating in the lower-temperature loop enters the integrated casting through the lower-temperature return port, mixes with liquid entering from the higher-temperature loop, and leaves the integrated casting through the lower-temperature supply port. The invention simplifies installation by integrating into one integrated casting all four ports and both the injection pump and lower-temperature loop pump.

Preferred implementations of this aspect of the invention may incorporate one or more of the following: A check valve in the higher temperature supply port may prevent liquid from entering the higher-temperature loop from the lower-temperature loop or fluid from the higher-temperature loop entering the fixture through the higher-temperature return port. The integrated pumping fixture may be for a radiant heating system, and the higher-temperature loop is a boiler loop, and the lower-temperature loop is a radiant loop. The integrated casting may have a mixing chamber formed therein, and the integrated casting may be configured so that the mixing chamber receives liquid entering the integrated casting through the radiant loop return port and through the boiler supply port, and so that the injection pump and the radiant loop pump each draw liquid from the mixing chamber. The mixing chamber may be configured to serve as an air elimination chamber with a vent at the top end. A check valve may be provided in the path followed by liquid traveling from the boiler supply port to the injection pump, or in the path from the injection pump to the boiler return port. The check valve may be incorporated into a passage through which liquid flows from the boiler supply port to the mixing chamber, thereby stopping flow from the radiant return from entering the boiler supply. The radiant loop supply and return ports may be located so that the ports are spaced apart by a distance approximating the spacing of the radiant supply and return ports on radiant heat flow manifolds. The integrated casting may be a single casting. The integrated casting may comprise a plurality of castings joined together by close-fitting, mating connections sealed with O-ring type seals. The invention has many advantages, some of which are described in the following detailed description.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

The descriptions below are more than sufficient for one skilled in the art to construct the disclosed implementations. Unless otherwise mentioned, the processes and manufacturing methods referred to are ones known by those working in the art.

FIGS. 2–7 show one implementation of the invention. An integrated casting 20 (bronze, plastic, or other material consistent with the applied system conditions) has boiler supply port 22 and boiler return port 24 formed on one side of the casting. A replaceable flow-check device 54 (FIG. 4) is installed in the boiler supply port (the inlet from the boiler loop). Formed on the other side of the casting are radiant loop supply port 26 and radiant loop return port 28. Each of the ports has a threaded connection (but any of the known alternative plumbing connections, e.g., sweated, could be substituted).

An injection pump 30 is bolted to flange 34. The impeller 35 of the injection pump is received in volute 36, formed in the integrated casting. Liquid flows into the injection pump at inlet 38, and exits at an outlet (not shown) at the periphery of the volute. An internal passage within the integrated casting connects the pump outlet to the boiler return port 24.

A radiant loop pump 40 is bolted to flange 42. The impeller 43 of the radiant loop pump is received in volute 44, formed in the integrated casting. Liquid flows into the radiant loop pump at inlet 46, and exits at an outlet (not shown) at the periphery of the volute. An internal passage within the integrated casting connects the pump outlet to the radiant loop supply port 26.

Water from the boiler loop enters the integrated casting through the boiler supply port 22, mixes with liquid returning from the radiant loop at return port 28, and leaves the integrated casting through the boiler return port 24. Water circulating in the radiant loop enters the integrated casting through the radiant loop return port 28, mixes with liquid entering from the boiler loop supply port, and leaves the integrated casting through the radiant loop supply port 26. Typically, the radiant loop pump produces a higher pressure than the injection pump, as a greater pressure is needed to move the water through the one or more radiant loops of the heating system.

In the implementation of FIGS. 2–7, the mixing occurs in mixing chamber 50, which is an elongated passage that in the implementation shown is preferably oriented vertically, so that air bubbles will tend to rise toward the top end of the mixing chamber, where there is an air discharge outlet to which is connected an air elimination device 52. The mixing chamber receives water entering the integrated casting from the radiant loop and from the boiler supply port. And both the injection pump and the radiant loop pump draw liquid from the mixing chamber.

The spacing (pitch) between the radiant loop supply and return connections is preferably set to match the standard spacing for radiant supply and return manifolds (which supply multiple radiant loops). The spacing (pitch) between the boiler supply and return connections is kept to a minimum, consistent with reducing friction induced differential pressure and associated ghost flow from the boiler loop into the injection loop.

The integrated casting is sized and configured to permit easy mounting of the casting to a wall panel. Electronic system controls can be mounted on the pumps, the integrated casting, or the support panel.

The integrated casting need not be a single casting, but can be a plurality of individual castings that have close-fitting, mating connections that are sealed by o-ring type seals. Typically, a bolt or other mechanical fastener would hold the plurality of individual castings together. The connections between the individual castings are not of the type used routinely for making connections between plumbing fittings in the field (e.g., sweat or threaded connections). The plurality of individual castings would be assembled at the factory and delivered to the customer as an assembled unit.

One example of using multiple castings would be to provide the volutes for the injection pump and the radiant loop pump using the same casting, so that two such castings would typically be used in the integrated casting.

Although the implementation described above is for radiant loop heating, it is not necessary that the invention be used in radiant loop heating. It could be applied to other applications, for example, to injecting heat from a higher-temperature loop into a lower-temperature loop, such as might be needed in a baseboard heating system in which different temperatures are used in different loops.

Instead of there being threaded pipe connections at the supply and return ports, the integrated casting could have other types of connections (e.g., sweated, union, barbed, and grooved).

Many other implementations of the invention other than those described above are within the invention, which is defined by the following claims.

What is claimed is:

1. An integrated injection-pumping fixture for hydronic heating systems, for providing an injection loop for transferring heat from a higher-temperature loop to a lower-temperature loop, the fixture comprising:
   an integrated casting;
   higher-temperature supply and return ports formed in the integrated casting;
   lower-temperature supply and return ports formed in the integrated casting;
   an injection pump volute formed in the integrated casting and configured to accept an impeller of an injection pump; and a lower-temperature loop pump volute formed in the integrated casting and configured to accept an impeller of a lower-temperature loop pump, wherein liquid from the higher-temperature loop enters the integrated casting through the higher-temperature supply port, mixes with liquid circulating in the lower-temperature loop, and leaves the integrated casting through the higher-temperature return port, and wherein liquid circulating in the lower-temperature loop enters the integrated casting through the lower-temperature return port, mixes with liquid entering from the higher-temperature loop, and leaves the integrated casting through the lower-temperature supply port.

2. The fixture of claim 1 further comprising a check valve in the higher-temperature supply port or higher-temperature return port.

3. The fixture of claim 1 wherein the integrated pumping fixture is for a radiant heating system, and the higher-temperature loop is a boiler loop, and the lower-temperature loop is a radiant loop.

4. The fixture of claim 3 wherein the integrated casting has a mixing chamber formed therein, and the integrated casting is configured so that the mixing chamber receives liquid entering the integrated casting through the radiant loop return port and through the boiler supply port, and so that the injection pump and the radiant loop pump each draw liquid from the mixing chamber.

5. The fixture of claim 3 wherein the mixing chamber is configured to serve as an air elimination chamber with a vent at the top end.

6. The fixture of claim 3 further comprising a check valve in the path followed by liquid traveling from the boiler supply port to the injection pump, or in the path from the injection pump to the boiler return port.

7. The fixture of claim 6 wherein the check valve is incorporated into a passage through which liquid flows from the boiler supply port to the mixing chamber, thereby stopping flow from the radiant return from entering the boiler supply.

8. The fixture of claim 3 wherein the radiant loop supply and return ports are located so that the ports are spaced apart by a distance approximating the spacing of the radiant supply and return ports on radiant heat flow manifolds.

9. The fixture of claim 3 wherein the integrated casting is a single casting.

10. The fixture of claim 3 wherein the integrated casting comprises a plurality of castings joined together by close-fitting, mating connections sealed with O-ring type seals.

* * * * *